United States Patent
Imel et al.

(10) Patent No.: US 9,051,953 B2
(45) Date of Patent: Jun. 9, 2015

(54) MOLLY-TYPE DOCK SECTION CONNECTOR

(71) Applicant: E-Z-Dock, Inc., Monett, MO (US)

(72) Inventors: Dustin Imel, Rocky Comfort, MO (US); Curtis Downs, Denver, NC (US)

(73) Assignee: E-Z-Dock, Inc., Monett, MO (US)

( * ) Notice: Subject to any disclaimer, the term of this patent is extended or adjusted under 35 U.S.C. 154(b) by 0 days.

(21) Appl. No.: 13/932,911

(22) Filed: Jul. 1, 2013

(65) Prior Publication Data

US 2015/0003919 A1  Jan. 1, 2015

(51) Int. Cl.
*B63C 1/02* (2006.01)
*F16B 19/10* (2006.01)
*E02B 3/06* (2006.01)

(52) U.S. Cl.
CPC ............. *F16B 19/1027* (2013.01); *E02B 3/068* (2013.01)

(58) Field of Classification Search
CPC ............ B63C 1/02; B63B 3/08; B63B 35/38; E02B 3/064
USPC ........... 405/218, 219; 403/228, 297; 114/263, 114/266, 267
See application file for complete search history.

(56) References Cited

U.S. PATENT DOCUMENTS

| | | | |
|---|---|---|---|
| 525,222 A | 8/1894 | Levering | |
| 979,853 A | 12/1910 | Hartshorn | |
| 3,339,449 A | 9/1967 | Lerich | |
| 3,570,021 A | 3/1971 | Watson | |
| 3,645,162 A | 2/1972 | Welch | |
| 3,824,644 A | 7/1974 | Stranzinger | |
| 3,964,230 A | 6/1976 | Fischer | |
| 4,883,396 A | 11/1989 | Shamah et al. | |
| 4,934,885 A * | 6/1990 | Woods et al. | 411/44 |
| 5,251,560 A | 10/1993 | Ban et al. | |
| 5,536,122 A | 7/1996 | Weber | |
| 5,810,502 A | 9/1998 | Reitz et al. | |
| 6,073,572 A | 6/2000 | Gruhn et al. | |
| 7,225,751 B2 | 6/2007 | Rueckert | |
| 7,270,501 B2 | 9/2007 | Kanflod et al. | |
| 8,608,407 B1 * | 12/2013 | Vaughn et al. | 405/219 |

* cited by examiner

*Primary Examiner* — Tara M. Pinnock
(74) *Attorney, Agent, or Firm* — Polster, Lieder, Woodruff & Lucchesi, L.C.

(57) ABSTRACT

A dock connector for the connection of dock members with receiving sockets includes a pair of end members configured to be received in respective receiving sockets of the dock member. Each end member has a pliable expansion member at a bottom thereof adapted for movement between a contracted/relaxed position and an expanded position. The end members are connected by a brace. A wedge is operatively mounted to the end member for axial translational motion relative to the end member. The wedge operates as an actuator to move the expansion member from its relaxed position to its expanded position.

16 Claims, 8 Drawing Sheets

MOLLY-TYPE DOCK SECTION CONNECTOR

CROSS-REFERENCE TO RELATED APPLICATIONS

Not applicable.

STATEMENT REGARDING FEDERALLY SPONSORED RESEARCH

Not applicable.

BACKGROUND

This application relates to a floating dock system comprised of dock members, such as drive-on watercraft lifts, floating dock segments, and the like, and, in particular, to a connector for assembling floating docks from the dock members.

Floating dock systems are made from selected dock members (such as rectilinear sections, watercraft lifts, ramps, etc.) which are assembled together by connectors. The rectilinear sections can be used to form deck areas, piers and the like. Over the years, many different types of connectors have been developed and used. Some require the connector, or a portion of the connector, to be installed from below the dock section. It would be desirable to provide a connector which is easy to install and to replace.

SUMMARY

A dock connector is disclosed which comprises at least one end member having a side surface, an upper surface, a bottom, and a brace extending from the side surface of the end member. An expansion member defining a downwardly opening chamber is at a bottom of the end member and is adapted for movement between a contracted position and an expanded position. A fastener extends through the end member from the upper end of the end member through the expansion member. The fastener is threaded at least at a bottom end thereof. A wedge is threadably received on the fastener to be movable by rotation of the fastener between a lowered position in which the expansion member is in the contracted position and a raised position in which the wedge engages the expansion member to urge the expansion member to its expanded position.

In accordance with an aspect of the connector, the dock connector can include at least one cap attached to the body. The cap can be formed from a different material than the body. The cap can include one of a groove or rib on a lower surface thereof which is slidably received over a rib or a groove, respectively formed on the upper surface of the connector body. The rib and groove are complementarily shaped to each other to permit horizontal motion of the cap relative to the body, but to prevent substantial vertical movement of the cap relative to the body.

A tool can be provided which is configured for engagement of the at least one cap to facilitate removal of the dock connector from a dock member in which the connector is placed.

In accordance with an aspect of the dock connector, the end member is generally frustoconically shaped.

In accordance with an aspect of the dock connector, the wedge comprises at least one anti-rotation tang and the expansion member defines at least one slot configured for receipt of the at least one tang.

In accordance with an aspect of the dock connector, the connector includes two end members; the end members being positioned on opposite ends of the brace.

In accordance with an aspect of the dock connector, the body is formed of a material which enables the connector brace to flex about an axis generally parallel to axes of the end members. The brace can, for example, be formed from a rubber, and the rubber can, for example, have a durometer of between about 60 and about 90.

The dock member in which the connector is received, includes an upper surface, a lower surface, a side surface between the upper and lower surfaces, and at least one receiving socket proximate the side surface. The socket extends downwardly from the upper surface and comprises an upper portion and a lower portion connected at a juncture. The socket lower portion has a dimension, at least in part, greater than a corresponding dimension of the juncture. A channel extends from the socket to the side surface. The socket is sized and shaped to receive the connector end member, and the channel is sized and shaped to receive the connector brace. The upper and lower portions of the receiving socket define a pair of generally truncated cones connected at their frustums.

DESCRIPTION OF THE DRAWINGS

In the accompanying drawings which form part of the specification.

Corresponding reference numerals indicate corresponding parts throughout the several figures of the drawings.

DETAILED DESCRIPTION

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

As shown in FIGS. 1-9, a connector 10 is provided for assembling a dock system 12 from a plurality of docking members 14 without the need for access to the bottom of the dock members. The dock system 12 includes a plurality of docking members 14, which can be generally similar to the dock members disclosed in U.S. Pat. Nos. 5,281,055 or 7,069,872, both of which are hereby incorporated by reference. Each generally rectangular docking member 14 is a generally hollow or foam filled self-floating one-piece molded construction that includes a generally level top surface 16, side walls 18, and a bottom surface 20. The docking members 14 can be constructed of any suitable material, such as a plastic, but any suitable material can be used. In alternate embodiments, the dock system 12 can include any number of docking members 14 of any desired shape and size.

Figure 1:
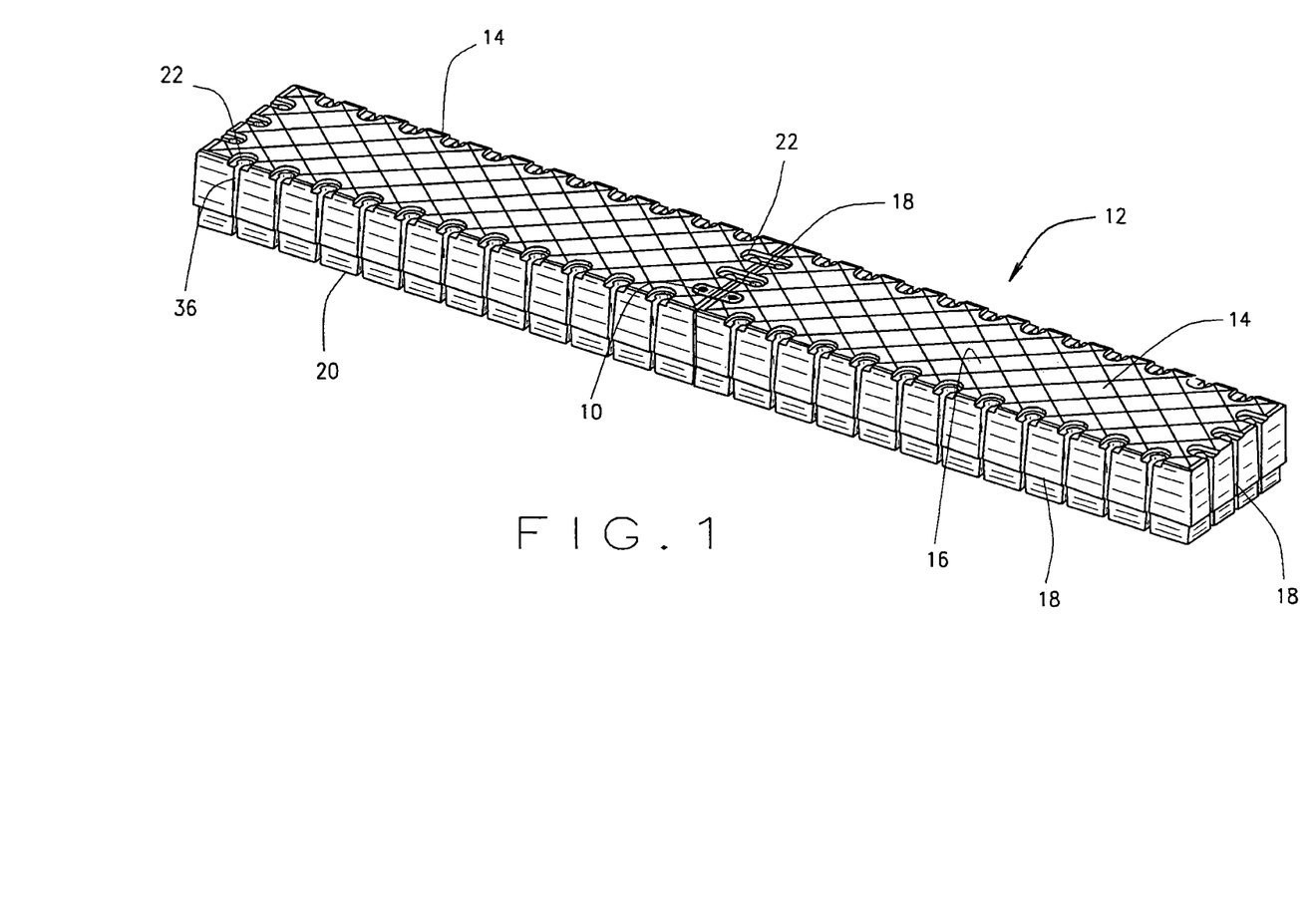
FIG. 1 is a perspective view of a pair of dock members connected to form a dock assembly.
Figure 1A:
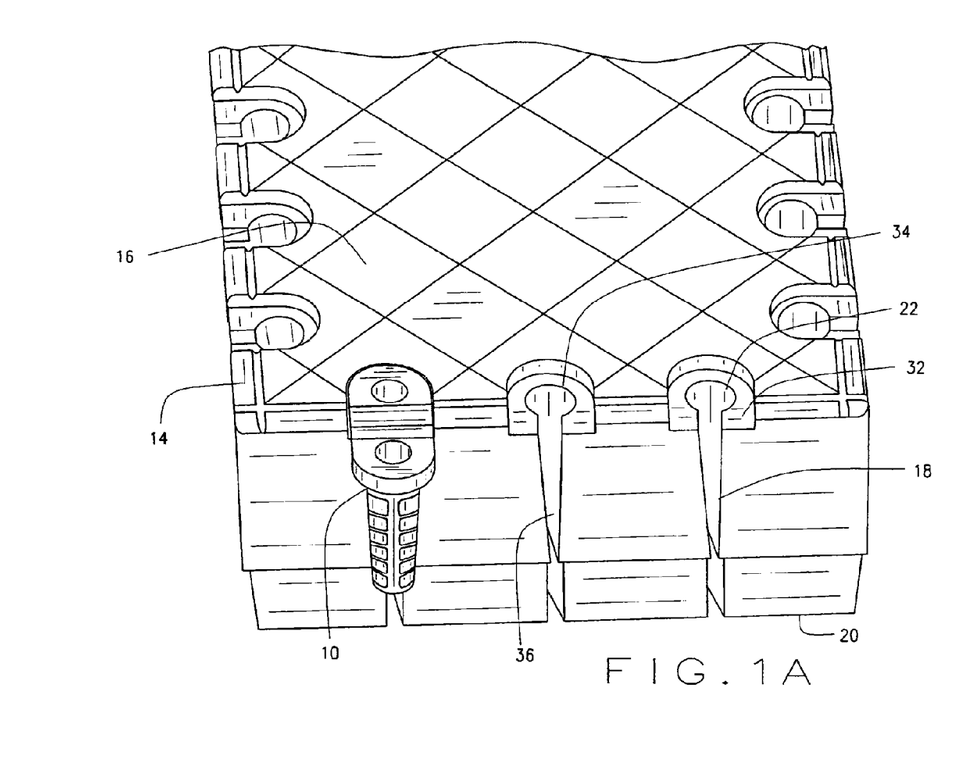
FIG. 1A is an end perspective view of a dock member with a connector in a receiving socket of the dock member.
Figure 8:
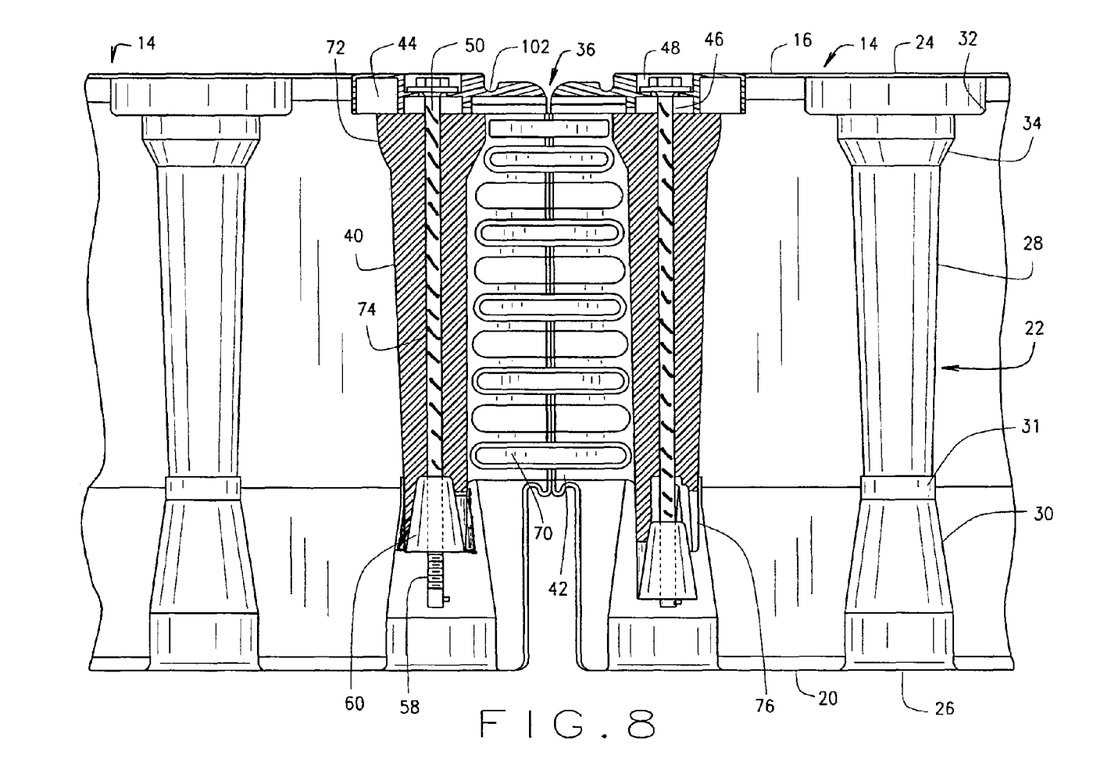
FIG. 8 is a partial sectional view of the dock connector received in the sockets of two adjacent dock members to connect the dock members.

Each docking member 14 defines a plurality of receiving sockets 22 configured to receive the connectors 10 for securing of the docking members 14 together to form the dock system 12. Generally, the receiving sockets 22 are located along the side walls 18 proximate the edges of the top surface 16 of the docking member 14 so that when docking members 14 are positioned adjacent each other, the respective receiving sockets 22 are aligned with each other. As shown in FIGS. 1, 1A and 8, each receiving socket 22 is illustratively shown to be generally shaped as a pair of truncated cones connected at their frustums and defines openings 24 and 26 in the top surface 16 and bottom surface 20, respectively of the member 14. In other words, the receiving socket 22 includes a generally conical-frustum upper portion 28 extending downwardly from the opening 24 in the top surface 16 to connect with a generally conical-frustum lower portion 30 extending upwardly from the opening 26 of the bottom surface 20. The upper portion 28 and lower portion 30 meet at a junction 31 having a diameter (or defining a cross-sectional area) that is smaller than the diameter (or cross-sectional area) of the lower portion 30. Although the receiving sockets 22 are shown to extend between the top surface 16 and bottom surface 20 of the dock member, so as to be opened at both the top and bottom surfaces, the sockets 22 could be closed at the bottom of the dock member without affecting the operability of the connector. The opening 24 of the top surface 16 defines a countersink 32 and a tapered portion 34 below the countersink 32. As seen in FIG. 1A, the countersink 32 opens to the side surface 18 of the dock member. The bottom portion 30 includes a lower cylindrical portion which then leads into the frustoconical portion. A channel 36 extends from the socket 22 to the side wall 18. The channel 36 is shown to be defined by side walls which taper inwardly toward each other from both the top and bottom to define a point of smallest width. The taper of the channel 36 generally follows the taper of the socket upper and lower portions. Although shown to be tapered, the channel 36 could be defined by generally straight or vertical side walls.

Figure 2:
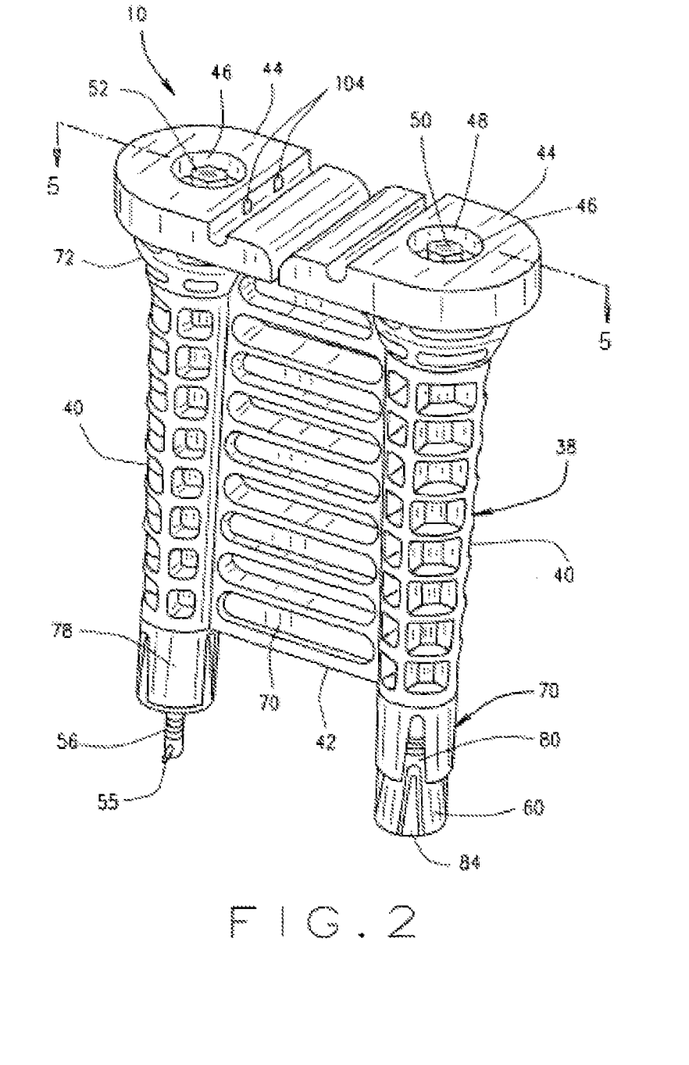
FIG. 2 is a perspective view of a dock connector configured to connect the dock members, the dock connector being illustratively shown with one end in a position to be inserted into a receiving socket of a dock member and the other end in a "locking" position.
Figure 3:
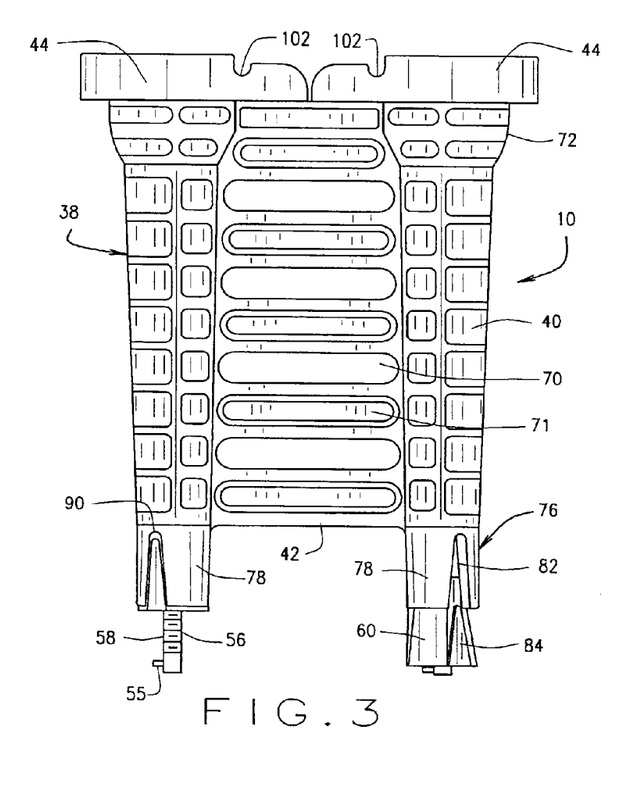
FIG. 3 is a front elevational view of the dock connector.
Figure 4:
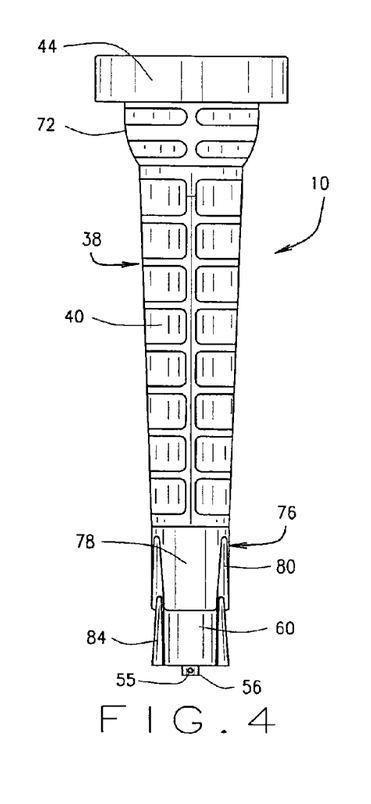
FIG. 4 is a side elevational view of the dock connector, taken from the left side of FIG. 3.

The connector 10 includes a body 38 shaped and configured to be received in the receiving sockets 22 and channels 36 defined in the docking members 14. (FIGS. 2-4). To this end, the connector body 38 is shaped generally complimentarily to the dock member socket 22 and channel 36. The body 10 includes a pair of elongate end members 40, sometimes referred to as molly-type fasteners, attached together via a brace 42. The body 38 is preferably made from a rubber which is selected to enable the body to flex at least about an axis extending vertically through the brace 42.

Figures 5, 6:
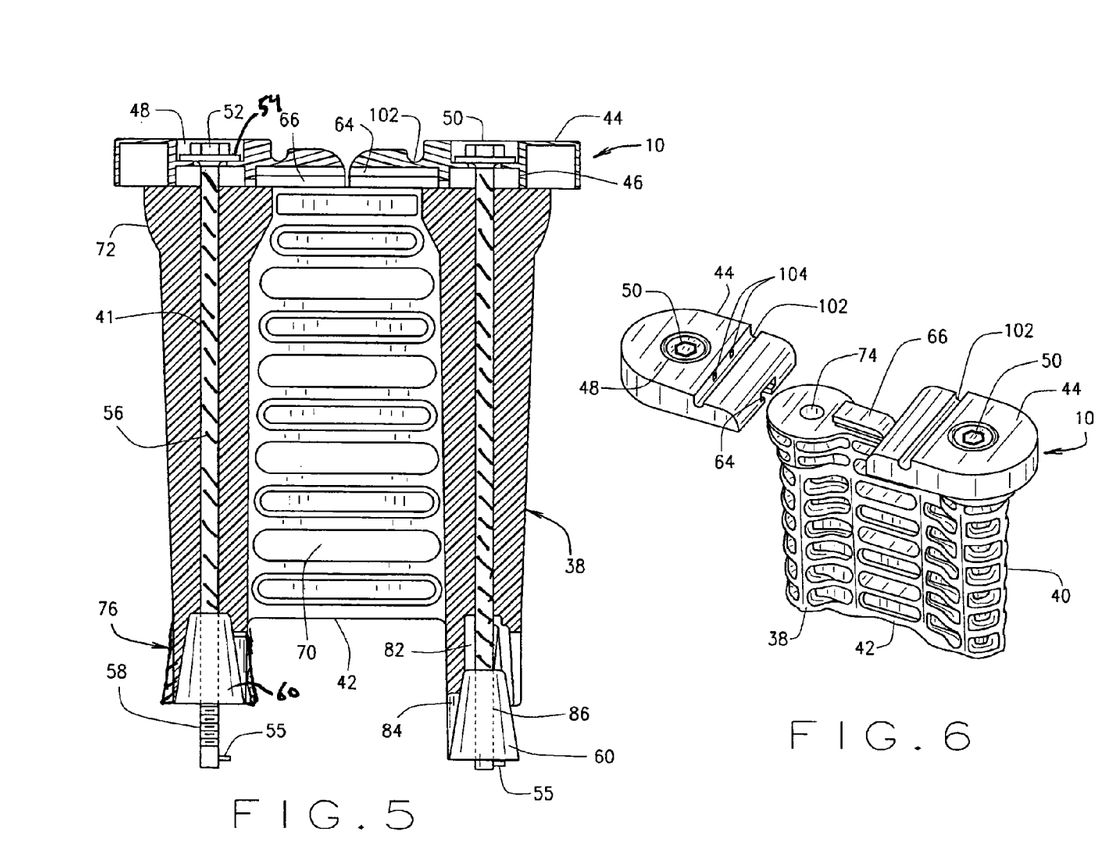
FIG. 5 is a sectional view of the dock connector taken along line 5-5 of FIG. 2.
FIG. 6 is a perspective partially exploded view of the dock connector showing the connection of a cap to the body of the connector.
Figure 7:
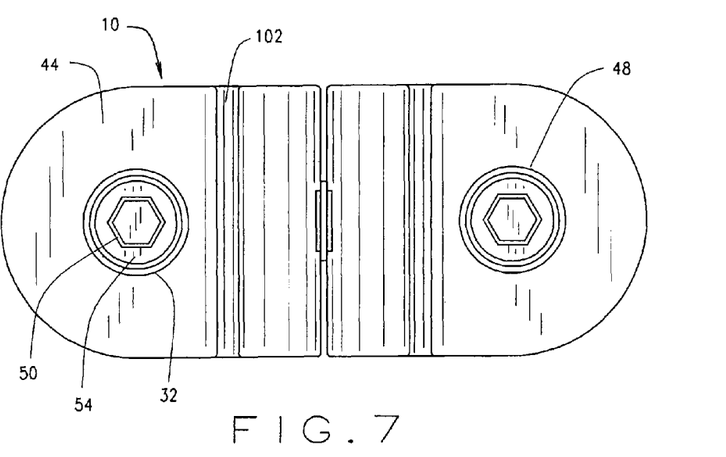
FIG. 7 is a top plan view of the dock connector.

A pair of caps 44 is mounted to the top of the body 38. The caps are sized and shaped to seat within respective countersinks 32 of the docking members 14 to sit flush with the top surface 16 of the docking members 14. As such, the top surfaces of the caps 44 form part of the tread or wear surface of the dock assembly. Each cap 44 is generally heel-shaped and defines a bore 46 and an annular countersink 48 sized to receive a fastener 50, such as bolt. (FIG. 5). The cap 44 is preferably formed from a plastic and is molded to correspond generally to the color and texture of the upper surface 16 of the member 14. The bottom surface 62 of the cap 44 defines a groove 64 (FIG. 6) shaped and sized to receive a tongue (or rib) 66 formed on the upper surface of the connector body 38. The groove 64 and tongue 66 are shaped complimentarily to each other, and are shaped such that the cap 44 can slide laterally onto the tongue 66, but so that the cap cannot be lifted vertically off the connector body 38. Although the tongue and groove are shown to be generally T-shaped, the tongue and groove could have any desired shape which would prevent the cap from being lifted vertically from the connector body. This slidable connection of the caps 44 to the connector body 38 allows for the caps to be removed and replaced should they be worn out, broken, or otherwise need replacement. Further, it allows for the cap and body to be made from different materials. Other means (such as a snap connection or a friction fit connection) can also be used to removably connect the caps to the body. A removable connection of the caps 44 to the body 38 is preferred. However, the caps 44 can be connected to the connector body 38 fixed to the body, such as by welding, adhesive, etc. Alternatively, the caps 44 can be combined with the connector body 38 into a unitary member. Further, the connector 10 is shown as provided with two caps 44. The two caps could be formed as a single cap which is then secured to the connector body 38.

Figure 9:
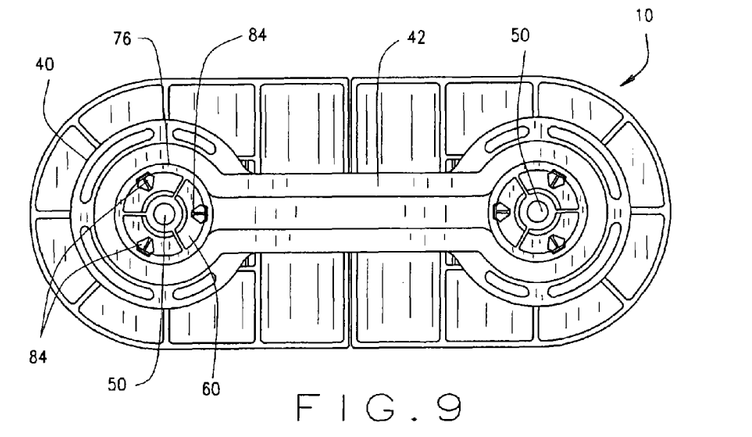
FIG. 9 of a bottom view of the dock connector.

As shown in the Figures, the connector body 38 is configured to be received in a pair of aligned receiving sockets 22 of adjacent docking members 14. The connector body 38 defines a pair of end members 40 connected by the brace 42. Each end member 40 is shaped complimentarily to the receiving sockets 22, and is thus illustratively shown to be generally frusto-conically shaped. The end members 40 have a length sufficient to extend at least through the junction 31 of the dock member socket 22 into the lower portion 30 of the socket 22. The end members 40 each have an enlarged tapered portion 72 at their upper ends which generally corresponds with the shape and size of the upper tapered portion 34 of the receiving sockets 22. Each end member 40 defines a generally cylindrical bolt hole 74 which is coaxial with and aligned with the bore 56 of the cap 44. The brace 42 is a panel that extends almost the entire length of the end members 40. The brace is generally rectangular in side elevation. As seen in FIGS. 6 and 9, the brace 42 has a width less than the diameter of the end members 40, and is sized to pass through the socket channel 36. Additionally, the brace tapers from top to bottom, such that it is narrower in width at its bottom than at its top. The brace 42 defines sections of removed material, such as through slots 70 and reduced width areas 71, to reduce the amount of material needed and to increase the strength the brace 42. However, the brace 42 can be any shape and size that positions the end members 40 at a fixed distance apart from each other and provides enough strength to withstand the forces exerted on the connector 10 by the docking members 14 during use. For example, the brace 42 can be configured as a lattice, web, ribs, crossbar, truss, or other suitable arrangement. Preferably, the body 38 is a unitary construction; however, the body 38 can also be comprised of multiple portions attached together by a suitable method, such as fastening or welding. Preferably, the connector body 38 is made from a flexible material, such as rubber with a durometer of between about 60 and about 90. This will enable the body to flex about the brace between the end members 40. However, the body 38 can be constructed of any suitable material.

The bottom end of each end member 40 includes an expansion member 76 that can move between a contracted position for inserting or removing the connector 10 from the receiving socket 22 (shown on the right side in FIGS. 5 and 8), and an expanded or locking position (shown on the left side in FIGS. 5 and 8). The expansion member is hollow and open at its bottom. The expansion member thus defines a downwardly opening chamber 82. In the contracted position, the expansion member has a diameter smaller than the diameter of the junction 31 between the upper and lower portions of the dock member socket 22 such that the end member can pass through the junction 31 of the socket 22. In the expanded or locking position, the expansion member 76 has a diameter greater than the junction 31 between the upper and lower sections of the receiving socket so as to prevent the connector 10 from being lifted vertically out of the receiving socket 22. (FIGS. 5 and 8). The expansion member 76 includes a plurality of generally rectangular expandable flanges 78 that extend downwardly formed by a plurality of generally triangular shaped slots 80. The flanges 78 define the downwardly opening chamber 82. The chamber 82 is generally conical.

The bolt 50 has a head 52 and flange 54 at the upper end of a shank 56, which is sized and shaped to be inserted into the countersink 32 of the cap 44. At least a bottom portion 58 of the shank 56 is threaded. The shank 56 is sized to pass through the cap bore 56 and the end member bolt hole 74, and has a length such that the shank extends beyond the bottom of the expansion member 76 of the end member. When the bolt 50 is in place, the threaded portion of the bolt is within the expansion member 76, and extends beyond the expansion member.

A wedge 60, having a threaded bore, is received on the threaded portion 58 of the bolt 50. A pin 55 extends outwardly from the bottom end of the bolt shank 56 to prevent the wedge 60 from coming off the bolt 50. The wedge 60 is a generally in the shape of truncated cone which is sized, shaped and configured to be received within the expansion member chamber 82. As seen in FIGS. 2 and 5, the expansion member 76 has a sloped side wall, such that it generally defines a truncated cone. The wedge 60 is sized to pass through the junction 31 between the upper and lower portions of the dock member socket 22. The diameter of the wedge increases towards its bottom, and has a diameter at its top which is less than the inner diameter of the expansion member 76 and a diameter at its bottom which is equal to or greater than the inner diameter of the expansion member. Anti-rotation tangs 84 (FIG. 2) project from the outer surface of the wedge 60 to be received in the slots 80 of the expansion member 76. Illustratively, the wedge 60 has three tangs 84, but can be provided with fewer or more, as may be desired. The tangs 84 are generally triangular shaped raised portions that generally correspond to the triangular slots 80 of the expansion member 76. The wedge defines a threaded bore 86 for coupling with the bolt 50.

As shown, the bolt shaft 56 extends below the bottom of the expansion member 76 a distance sufficient to enable a majority of the wedge 60 to be positioned below the bottom of the expansion member. The tangs 84 are of a height such that when the wedge 60 is in its lowered position, the upper end of the tangs will be positioned within the bottom of expansion member slots 80. In this position (shown on the right side, for example, in FIG. 5), the flanges 78 of the expansion member 76 are in a contracted position to allow the connector end member 40 to be inserted into the receiving socket 22. When the bolt 50 is rotated, the interaction of the tangs 84 with the expansion member slots 80 will prevent the wedge from rotating with the bolt. Hence, when the bolt is rotated in a first direction, the wedge will ride up the bolt, and when the bolt is rotated in the opposite direction, the wedge will ride down the bolt. As such, the wedge will translate along the bolt shaft vertically within the chamber 82 of the expansion member 76. As the wedge moves upwardly in the expansion member chamber, the tapered side wall of the wedge engages the inner side wall of the expansion member 76 and the expansion member 76 will expand to a diameter greater than the diameter of the junction 31 between the upper and lower portions of the receiving socket 22. When the wedge translated downwardly, the expansion member will relax to resume its contracted position.

Although the embodiment of FIGS. 1-9 includes an expansion device 76 with flanges 78 actuated by the wedge 60, other alternative embodiments of the expansion device can also be used. For example, the flanges 78 and wedge 60 can be configured in other shapes and sizes, such as any rectilinear or curvilinear shapes that provide for movement between the contracted and expanded positions. Additionally, alternate arrangements, other than the tang 84 and slot 80 can be used to prevent the wedge from rotating relative to the end member. For example, the wedge can be provided with a rib which is received in an inner groove or channel in the expansion member. Conversely, the wedge can be provided with a groove or channel which receives a rib on the inner surface of the expansion member.

To assemble the connector 10, a pair of caps 44 is attached to the top of the connector body 38 using the tongues 66 and grooves 64. (FIG. 6). A pair of bolts 50 is inserted through the bores 46 of the caps 44, through the bores 74 of the end members 40. The wedges 60 are then threaded onto the bottom of the bolt and are arranged such that its tangs 84 are received in the slots 80 of the expansion member 76. The pin 55 is then placed through a hole extending through the bolt shaft to prevent the wedge 60 from coming off the shaft. The connectors 10 are preferably supplied in this assembled state.

To secure two dock sections together, an assembled connector, with the wedge 60 in a lowered position (such as shown on the right side of FIG. 5), is inserted into a pair of aligned docking members 14 until the tapered portions 72 of the end members 40 seat against the tapered portion 34 of the sockets 22. (FIG. 8). In this position, the connector caps 44 are received within the countersinks 32 and are flush with the top surface 16 of the docking members 14. Thus, as noted above, the top surface of the caps 44 will form part of the wear or tread surface of the dock assembly. Using an appropriate tool, such as a wrench, each bolt 50 is rotated to move the wedge upwardly within the expansion member chamber 82 to expand the expansion member 76 to its expanded position. As the wedge 60 moves upwardly, the tapered outer surface 87 of the wedge engages the inner surface of the expansion member to deform the expansion member flanges 78 outwardly to a position in which the effective diameter of the expansion member 76 is greater than the diameter of the junction 31 between the upper and lower portions of the receiving socket 22 of the dock member 14. The expansion member 76 can, but need not, expand to a size in which it engages or contacts the walls of the lower portion 30 of the socket 22. To prevent over tightening of the bolt 50, the tangs 84 contact a vertex 90 of the slots 80 and prevent any more turning of the bolt 50. In this way, the connector 10 engages the receiving sockets 22 and couples the docking members 14 together without any need for the installer to have access to the bottom of the dock system 12. When the wedge 60 is tightly received in the expansion member (i.e., when the top of the wedge tang is urged against the top of the expansion member slot), the bolt 50 will be in tension and the expanded condition of the expansion member will prevent the end member 40 from being lifted out of the receiving socket 22.

To remove the connector 10, the bolts 50 are rotated in the opposite direction to lower the wedge 60 to their lowered positions which will allow the expansion member to return to its contracted position. The pin 55 prevents of the wedge 60 from coming off the bolt 50. In fact, when the wedge 60 contacts the pin 55, the operator will no longer be able to turn the bolt. This will then serve as a signal to the operator that the wedge 60 has been fully lowered. When both wedges are lowered, the connector 10 can be removed from a pair of connected dock members.

Figure 10:
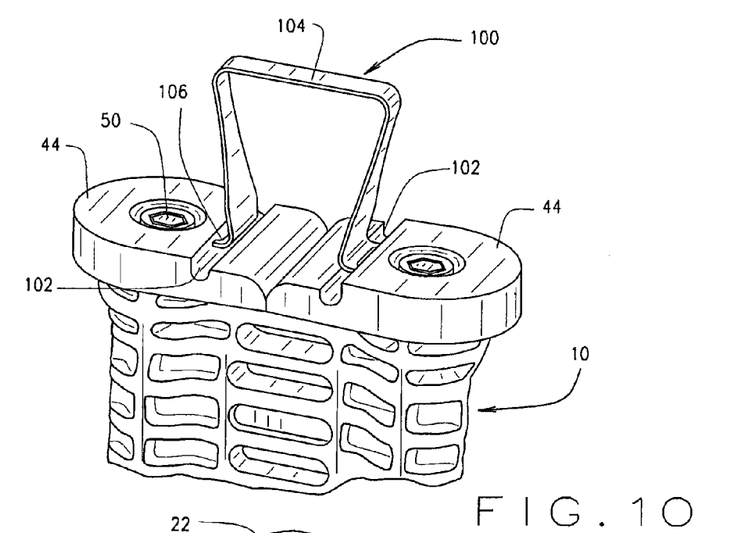
FIG. 10 is a partial perspective view of a tool engaged with the connector.
Figure 11:
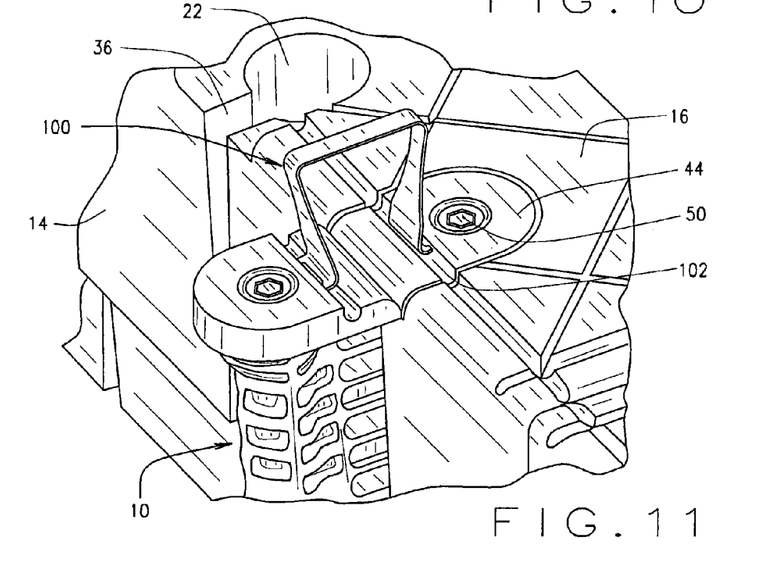
FIG. 11 is a partial perspective view of the connector coupled with a dock member and a tool engaged with the connector.

A tool 100 (FIGS. 10-11) is provided to facilitate removal of the connector from the dock members. The caps 44 include channels 102 with indents or holes 104 in an outer surface of the channels 102. The tool 100 has a handle 104 with arms 105 extending outwardly and terminating in tines 106 which are sized to engage the channel indents 104. The tool is made of a spring metal, such that the tool can be squeezed slightly to align the tool tines with the channel indents 104, and then released to engage the tines with the channel indents 104. With the tool tines 106 engaged with the channel indents 104, the connector 10 can be lifted and removed from the receiving sockets 22. Although the tool is provided with tines which engage holes or indents in the cap channels 102, the tool could be coupled to the cap in other desired ways to facilitate removal of the connector from the dock members.

As can be appreciated, the connector 10 can be inserted into the receptacles of the dock members from the top of the dock members. There is no need to access the underside of the dock members. Thus, use of the connectors 10 allow for a dock to be assembled completely from the upper surface of the dock. Further, as noted above, the connector body 38 is flexible. The flexibility of the connector brace 42 allows for slight variance in the position of the receptacles of two adjacent dock members, and facilitates insertion of the connector 10 into the receptacles of the adjacent dock members when the centers of the receptacles are slightly offset from each other. Further, the flexibility of the connectors allows for a slight relative motion between adjacent dock sections.

Changes can be made in the above constructions without departing from the scope of the invention, it is intended that all matter contained in the above description or shown in the accompanying drawings shall be interpreted as illustrative and not in a limiting sense. For instance, the connector end members 40 and receiving sockets 22 can be configured with different shapes and sizes, including, but not limited to, pyramidal, or square, as long as the end members and sockets are complementary to each other. Further, the connector end members 40 and receiving sockets 22 need not be tapered, so long expansion member 76 can be enlarged to a size which will prevent the connector end member from being removed vertically from the receiving socket. In addition, the receiving socket 22 should include a lower portion adapted to mate with the expansion member 76. Although shown with two end members 40, the connector 10 could be provided with a single end member. The opposite end of the brace could then be configured to attach an accessory to the dock member. Although the bolt 50 is the preferred means to move the wedge 60 relative to the expansion member, other means could be used as well to move the wedge 60 within the expansion member. These examples are merely illustrative.

What is claimed is:

1. A dock connector comprising:
   a body comprising two opposed end members, each end member having a side surface, an upper surface and a bottom, said end member having an expansion member at a bottom thereof adapted for movement between a contracted position and an expanded position; said expansion member defining a downwardly opening chamber;
   a brace extending between said end members; said brace being made from a material which enables said brace to flex about a vertical axis generally parallel to axes of said end members;
   a fastener extending through each said end member from said upper end through said expansion member; said fastener being threaded at least at a bottom end thereof; and
   a wedge threadably received on said fastener of each end member; said wedges being independent of each other and independently movable by rotation of their respective fasteners between a lowered position in which said expansion member is in said contracted position and a raised position in which said wedge engages said expansion member to urge said expansion member to said expanded position.

2. The dock connector of claim 1, further comprising at least one cap removably connectable to the body.

3. The dock connector of claim 2, further comprising a tool configured for engagement of the at least one cap and for removal of the dock connector from a dock member in which the connector is placed, wherein said at least one cap defines indents exposed to an upper surface of said at least one cap and said tool comprises tines sized to be received in said indents of said cap.

4. The dock connector of claim 1, wherein said end member is generally frustoconically shaped.

5. The dock connector of claim 1, wherein the wedge comprises at least one anti-rotation tang extending from a side surface of said wedge generally perpendicularly to an axis of said wedge; and
   wherein the expansion member defines at least one slot formed in a wall of said expansion member, said at least one slot being configured for receipt of the at least one tang.

6. The dock connector of claim 1 wherein at least said brace is formed from a flexible rubber.

7. The dock connector of claim 6 wherein said rubber has a durometer of between about 60 and about 90.

8. A dock connector for the connection of dock members, the dock connector comprising:
   a body having two opposed end members; each end member comprising:
      an expansion member at a bottom thereof, said expansion member having a wall defining a downwardly opening chamber; said expansion member being deformable so as to be movable between a contracted position and an expanded position; and
      a wedge having a dimension that, at least in part, is at least equal to a corresponding inner dimension of said chamber; said wedge being operatively mounted to said body for translational motion relative to said expansion member chamber between a lowered position and a raised position, wherein, when in said lowered position, said expansion member is in said contracted position, and when in said raised position, said wedge engages the wall of said expansion member chamber to urge said expansion member to its said expanded position; and a brace extending between said opposed end members; said brace being generally rectangular and being made from a material which enables said brace to flex about a vertical axis generally parallel to axes of said end members.

9. The dock connector of claim 8 further including a fastener extending through each of said end members; said fastener having a head at a top of said end member and a threaded portion at a bottom of said end member; said wedges being threadably received on said fasteners; said wedges and said expansion members further including cooperating portions of an anti-rotation device to prevent said wedges from rotating substantially relative to said expansion members; whereby rotation of said fasteners moves said wedges independently of each other between their respective lowered and raised positions.

10. The dock connector of claim 9, wherein said anti-rotation device comprises at least one tang protruding from one of said wedge and expansion member wall wedge generally perpendicularly to an axis of said expansion member; and at least one slot on the other of said wedge and expansion member wall; said at least one slot being configured for receipt of the at least one tang.

11. The dock connector of claim 8, further comprising at least one cap removably attached to the body.

12. The dock connector of claim 11 wherein said at least one cap is formed from a different material than said body.

13. The dock connector of claim 8 wherein said end member has a tapered surface.

14. A dock connector for the connection of dock members, the dock connector comprising:

a body having an expansion member at a bottom thereof, said expansion member having a wall defining a downwardly opening chamber; said expansion member being deformable so as to be movable between a contracted position and an expanded position;

a wedge having a dimension that, at least in part, is at least equal to a corresponding inner dimension of said chamber; said wedge being operatively mounted to said body for translational motion relative to said expansion member chamber between a lowered position and a raised position, wherein, when in said lowered position, said expansion member is in said contracted position, and when in said raised position, said wedge engages the wall of said expansion member chamber to urge said expansion member to its said expanded position;

at least one cap attached to the body wherein said cap has one of a groove and rib on a lower surface thereof; and said connector body has the other of said groove and rib on an upper surface thereof; said rib and groove being complementarily shaped to permit horizontal motion of the cap relative to the body, but to prevent substantial vertical movement of the cap relative to the body.

15. A dock assembly comprised of two or more dock members connected by a plurality of dock connectors;

said dock members comprising an upper surface, a lower surface, a side surface between the upper and lower surfaces, and at least one receiving socket proximate said side surface; said socket extending downwardly from said upper surface and comprising an upper portion and a lower portion connected at a juncture; said lower portion of said socket having a dimension, at least in part, greater than a corresponding dimension of said juncture; and a channel extending from said socket to said side surface;

each dock connector of said plurality of dock connectors comprising:

a body having two opposed end members, each end member being sized and shaped to be received in said socket and having a length to extend at least into said socket lower portion; each said end member comprising:

a pliable expansion member at a bottom thereof; said expansion member defining a downwardly opening chamber and being selectively movable between a relaxed position in which said expansion member is sized to pass through said juncture of said socket and an expanded position in which said expansion member has a dimension greater than the dimension of said juncture to prevent said connector from being removed from said socket; and a wedge having a dimension that, at least in part, is at least equal to a corresponding inner dimension of said chamber; said wedge being operatively mounted to said end member for translational motion relative to said expansion member chamber between a lowered position and a raised position, wherein, when in said lowered position, said expansion member is in said relaxed position, and when in said raised position, said wedge engages the wall of said expansion member chamber to urge said expansion member to its said expanded position; and a brace extending between said end members; said brace being sized and shaped to extend through said channel of said dock member; said brace being generally rectangular and being made from a material which enables said brace to flex about a vertical axis generally parallel to axes of said end members.

16. The dock connector of claim 15, wherein the upper and lower portions of said receiving socket define a pair of generally truncated cones connected at their frustums.

* * * * *